US006429376B1

(12) United States Patent
Mendoza

(10) Patent No.: US 6,429,376 B1
(45) Date of Patent: Aug. 6, 2002

(54) ADD-ON TROUGH FOR CABLE MANAGEMENT RACK

(75) Inventor: Jose-Filonel T. Mendoza, Brooklyn Center, MN (US)

(73) Assignee: ADC Telecommunications, Inc., Eden Prairie, MN (US)

(*) Notice: Subject to any disclaimer, the term of this patent is extended or adjusted under 35 U.S.C. 154(b) by 0 days.

(21) Appl. No.: 09/800,425

(22) Filed: Mar. 6, 2001

(51) Int. Cl.[7] ............................................. H02G 3/04
(52) U.S. Cl. ..................... 174/97; 174/68.3; 174/101; 361/826
(58) Field of Search ..................... 174/49, 60, 68.3, 174/72 A, 97, 99 R, 101; 211/26, 189; 361/644, 650, 655, 658, 730, 825, 826, 827; 379/326, 327; 385/134

(56) References Cited

U.S. PATENT DOCUMENTS

| 2,896,009 A |   | 7/1959 | Caveney |       |
|-------------|---|--------|---------|-------|
| 4,255,610 A | * | 3/1981 | Textoris | 174/97 |
| 4,391,426 A | * | 7/1983 | Gothberg | 174/97 |
| 4,603,377 A |   | 7/1986 | Kobayashi et al. | |
| 4,665,546 A |   | 5/1987 | Brey et al. | |
| 5,023,404 A |   | 6/1991 | Hudson et al. | |
| 5,220,600 A |   | 6/1993 | Chouanard et al. | |

(List continued on next page.)

FOREIGN PATENT DOCUMENTS

| DE | 93 02 456.8   | 5/1993  |
| FR | 2 446 040     | 8/1980  |
| WO | WO 98/35175   | 8/1998  |
| WO | WO 00/72646 A2 | 11/2000 |

OTHER PUBLICATIONS

ADC Telecommunications "Global Copper Cable Management Planning Guide", pp. 1–66, (©2000).
ADC Telecommunications "RZX–3 Products", pp. 1–29, (Sep. 2000).

(List continued on next page.)

Primary Examiner—Dean A. Reichard
Assistant Examiner—Adolfo Nino
(74) Attorney, Agent, or Firm—Merchant & Gould P.C.

(57) ABSTRACT

The present invention includes an add-on trough for use with existing telecommunications equipment racks having cable management troughs. The add-on troughs engage the outer edge of the existing troughs and permit higher densities of telecommunications circuits to be incorporated with these racks. Several alternative embodiments are adapted for mounting on either upper or lower troughs, or on lower troughs only. The troughs may incorporate a reinforcement structure as required to support the weight of cables placed within the trough without sagging. A variety of openings for telecommunications cable passage into and out of the troughs are provided. A power cable route is incorporated into the design of certain embodiments.

27 Claims, 5 Drawing Sheets

U.S. PATENT DOCUMENTS

| | | | |
|---|---|---|---|
| 5,326,934 A | | 7/1994 | LeMaster et al. |
| RE34,955 E | | 5/1995 | Anton et al. |
| 5,497,444 A | | 3/1996 | Wheeler |
| 5,586,012 A | | 12/1996 | Lerman |
| 5,683,001 A | | 11/1997 | Masuda et al. |
| 5,758,003 A | | 5/1998 | Wheeler et al. |
| 5,765,698 A | | 6/1998 | Bullivant |
| 5,788,087 A | | 8/1998 | Orlando |
| 5,792,992 A | * | 8/1998 | Handler ............... 174/101 |
| 5,819,956 A | | 10/1998 | Rinderer |
| 5,867,372 A | | 2/1999 | Shie |
| 5,921,402 A | | 7/1999 | Magenheimer |
| 5,947,571 A | * | 9/1999 | Ho ....................... 361/825 |
| 6,102,214 A | | 8/2000 | Mendoza |
| 6,215,064 B1 | * | 4/2001 | Noble et al. ........... 361/826 |
| 6,223,909 B1 | | 5/2001 | Mendoza |

OTHER PUBLICATIONS

ADC Telecommunications "DSX–600™" El Super High Density Solutions, 34 pages, (Jun. 1999).

ADC Telecommunications "DSX–1 Digital Signal Cross–Connect, Rack Framework and Accessories", 7th Ed., pp. 1–35, (Aug. 2000).

ADC Telecommunications "DSX–1 Modules and Panels", pp. 1–58, (May 2000).

ADC Telecommunications "Digital Distribution Frame Products", pp. 1–16, (3/92).

ADC Telecommunications "Digital Signal Cross–Connect (DSX–3), Front and Rear Cross–Connect Products", pp. 1–71, (2/99).

ADC Telecommunications "DSX–1 Digital Signal Cross–Connect, Modules, Panels and Accessories", pp. 1–81, (5/98).

ADC Telecommunications "DSX–1 Digital Signal Cross–Connect, Rack Framework and Accessories", 6th Ed., pp. 1–25, (10/95).

ADC Telecommunications "Fiber Cable Management Products", Second Edition, pp. 26–144, (10/95).

ADC Telecommunications "FL2000 Products", pp. 1–48. (11/96).

ADC Telecommunications "Mini DSX–3 Products", pp. 1–35, (6/97).

ADC Telecommunications "Next Generation Frame (NGF) Product Family Ordering Guide", pp. 1–21, (10/98).

* cited by examiner

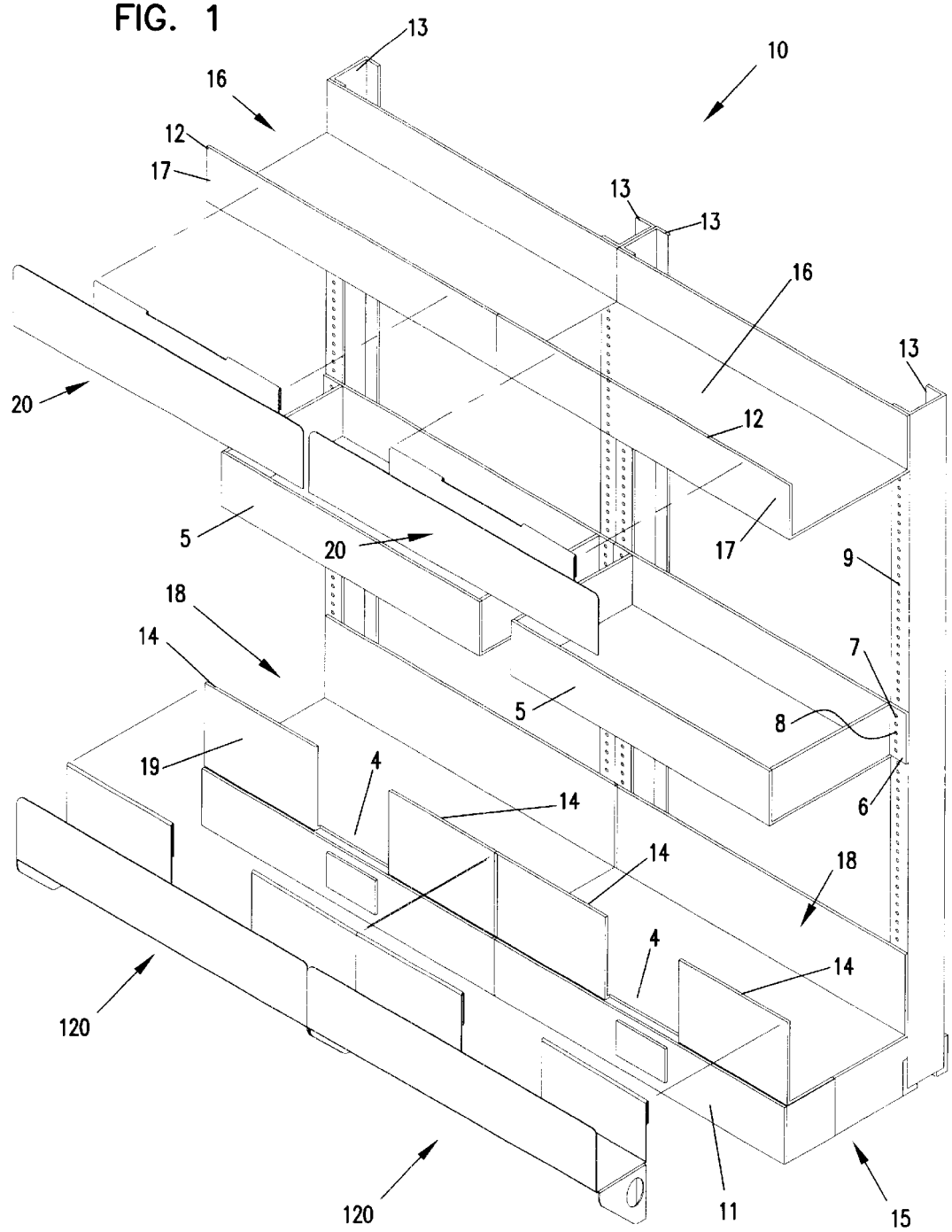

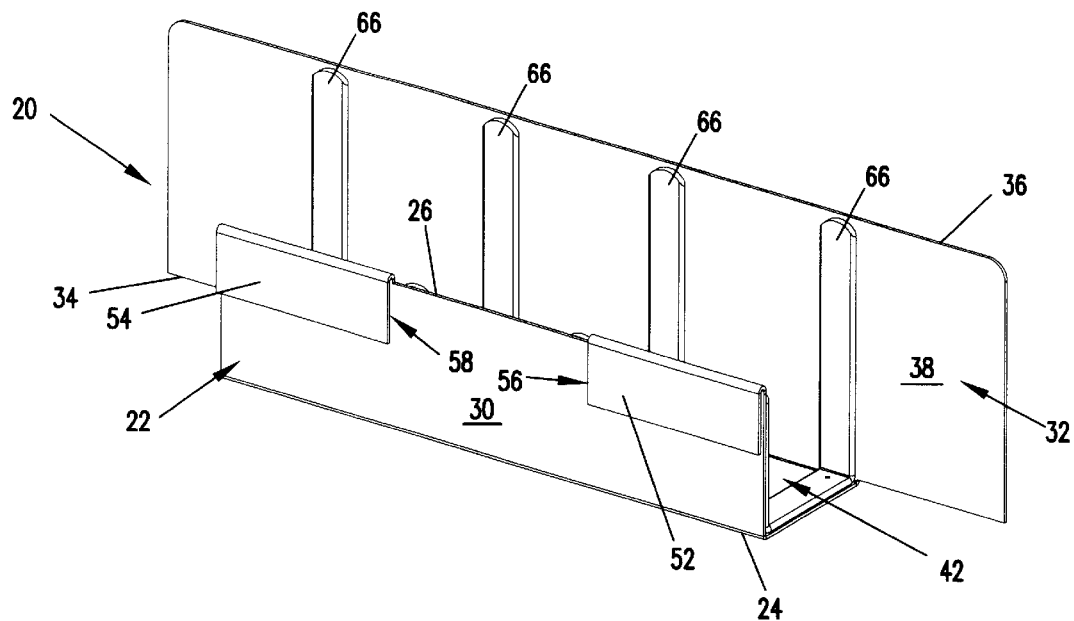
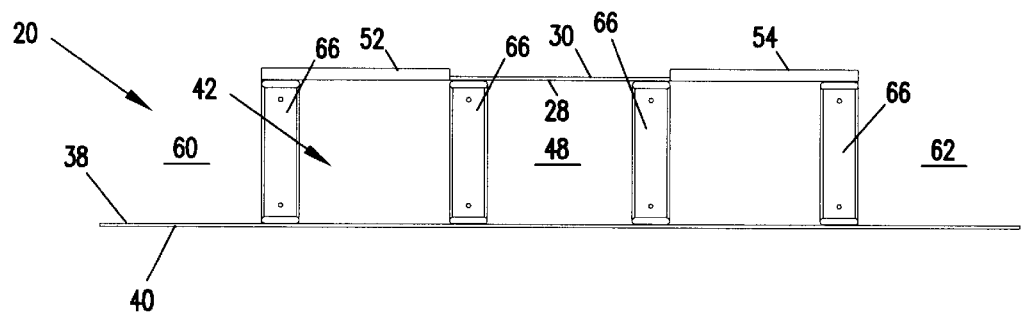
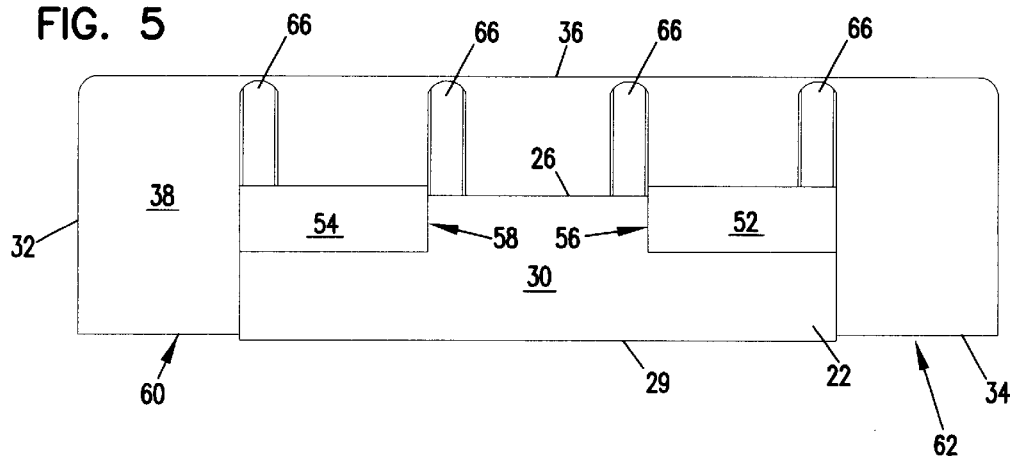

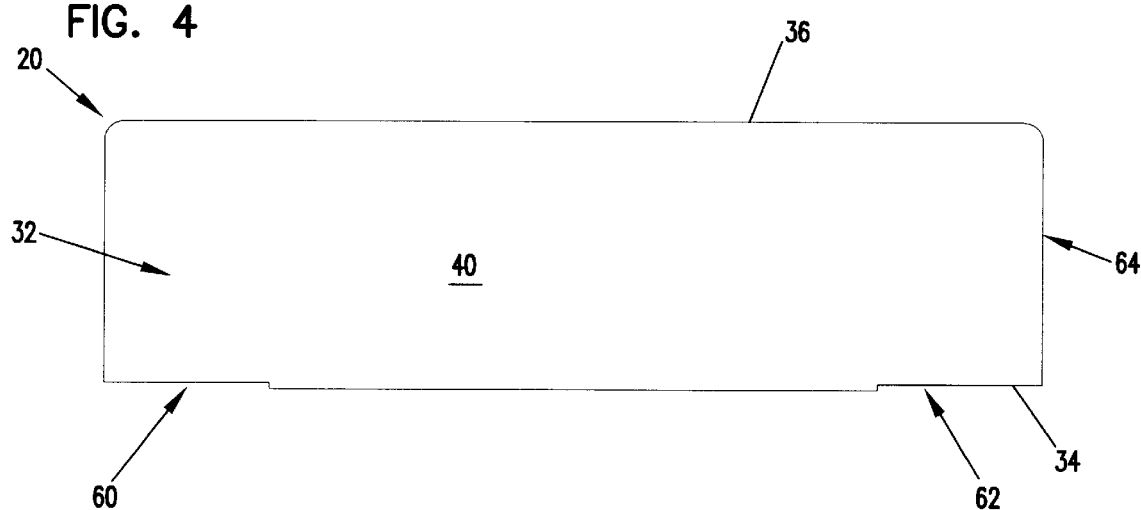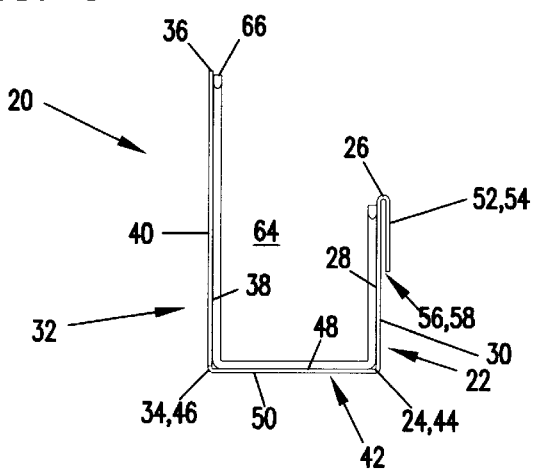

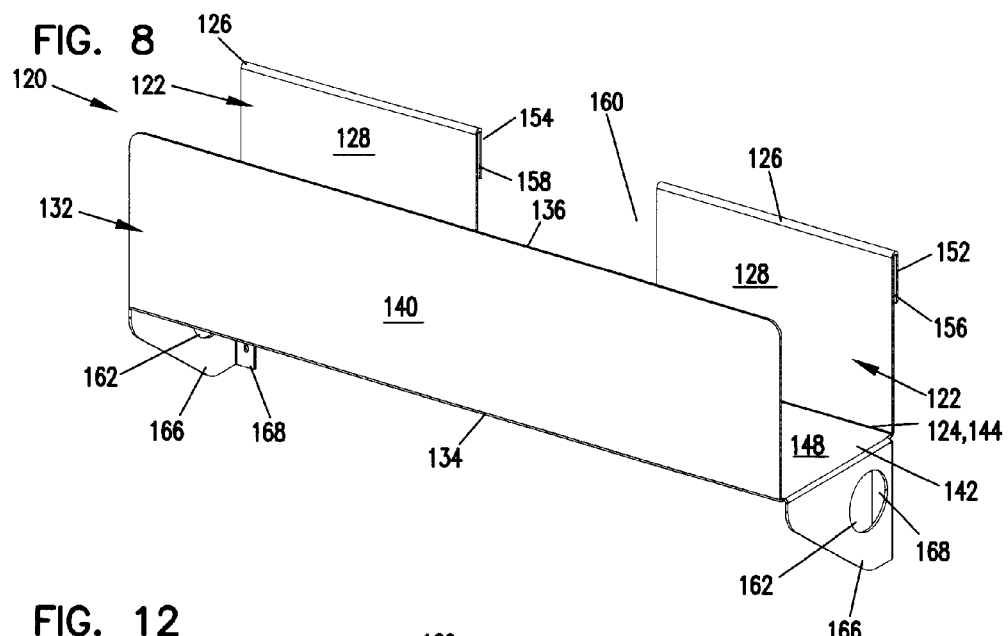
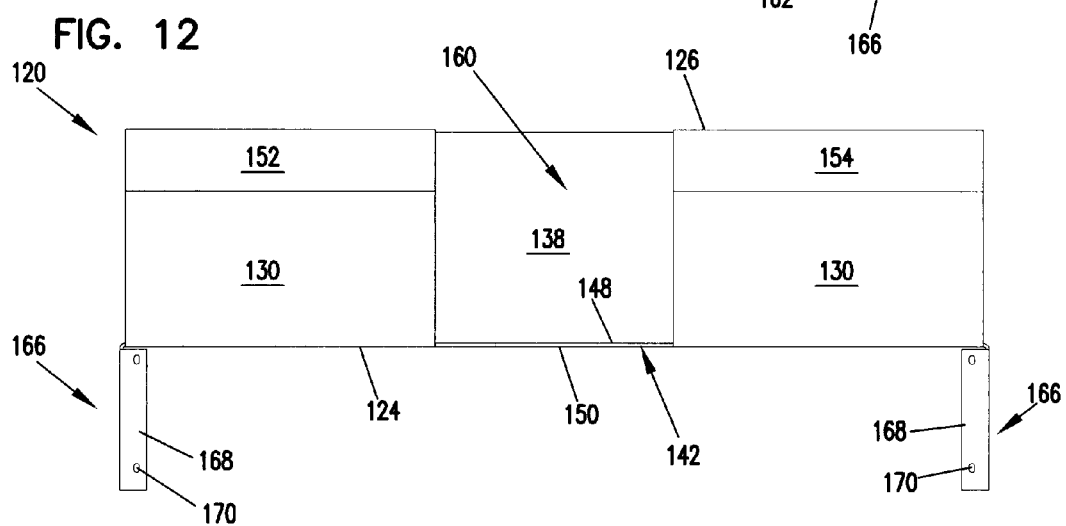
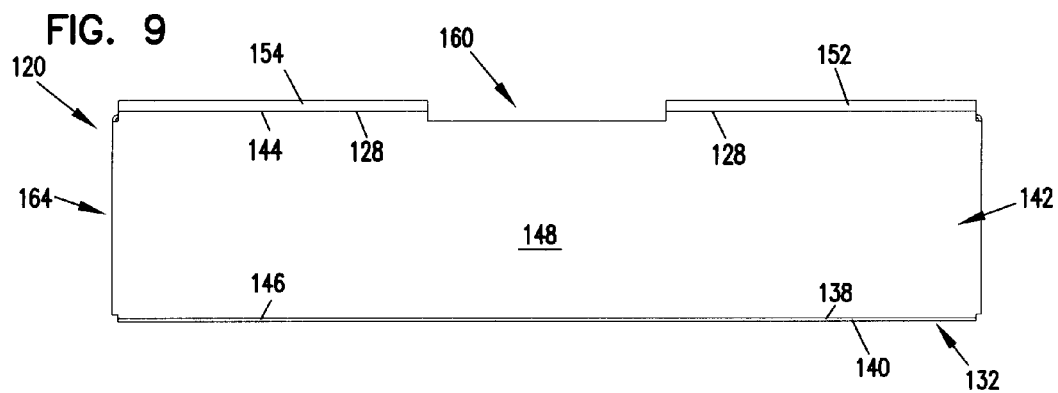

ADD-ON TROUGH FOR CABLE MANAGEMENT RACK

FIELD OF THE INVENTION

The present invention relates to high-density cable management racks. Specifically, the invention relates to providing increased trough space for cable management racks.

BACKGROUND OF THE INVENTION

In the telecommunications industry, one of the biggest changes has been the increase in density of circuits required to service the current demand. In some cases, previously installed equipment racks have been retrofitted to hold higher density switch panels and other modules which provide a higher density of circuits. In other installations, the overall number of equipment racks installed at a particular location has been increased to provide more circuits. Either of these approaches is effective at solving the issue of density but both have also spawned a new issue: cable management overload.

When the density of circuits is increased at a particular location, the number of jumpers or cross-connect cables required will also increase proportionately. Once these jumpers have been installed they are organized in troughs and channels that run horizontally and vertically across the equipment racks. These troughs were originally sized to hold a certain number of jumpers, based on the original density of the particular rack or overall installation. In the case of horizontal troughs, when the density of the rack or installation is dramatically increased, these troughs can be insufficient to handle the added number of jumpers. Overloaded troughs can cause operational and maintenance problems due to the difficulty of getting to jumpers in the now heavily loaded troughs or the troughs may physically not be able to hold the number of jumpers required by the modified installations.

The demand for higher density telecommunications installations shows no signs of abating in the foreseeable future and it promises to continue increasing beyond current levels. Improving the ability of current installations to be retrofitted to handle this increased demand is desirable.

SUMMARY OF THE INVENTION

One aspect of the present invention is an add-on cable management trough for use with existing telecommunications equipments racks having pre-existing cable management troughs. This add-on trough has a slot which engages the outer edge of the existing fixed cable trough. The add-on trough may also include reinforcing members mounted inside the trough. The add-on trough may also have a bottom which is shorter than one or both of the sides of the trough. The add-on trough may include reinforcing legs below the bottom of the trough which rest against a portion of the rack and may have an opening in the wall of the trough to allow cables to pass from the fixed trough into the add-on trough.

A cable management system is provided whereby troughs are added to the outer edges of fixed troughs attached to telecommunications equipment racks. These add-on troughs can be attached to either upper or lower fixed troughs and may have openings through the walls of the trough to permit cables to enter or exit the add-on trough. Add-on troughs attached to adjacent telecommunications equipment racks cooperate to form continuous add-on cable channels.

A method of adding a further trough to a cable management trough fixed to a telecommunications equipment rack is also provided.

A variety of advantages of the invention will be set forth in the description that follows, and in part will be apparent from the description, or may be learned by practicing the invention. It is to be understood that both the foregoing general description and the following detailed description are explanatory only and are not restrictive of the invention as claimed.

BRIEF DESCRIPTION OF THE DRAWING

The accompanying drawings, which are incorporated in and constitute a part of the specification, illustrate several aspects of the invention and together with the description, serve to explain the principles of the invention. A brief explanation of the drawings is as follows:

FIG. 1 is a top perspective view of two telecommunications equipment racks with first upper and lower troughs shown mounted to the racks and add-on second troughs exploded.

FIG. 2 is a top perspective view of an embodiment of an add-on trough according to the present invention.

FIG. 3 is a top view of the trough in FIG. 2.

FIG. 4 is a side view of the trough in FIG. 2.

FIG. 5 is an opposite side view of the trough in FIG. 2.

FIG. 6 is an end view of the trough in FIG. 2.

FIG. 8 is a perspective view of another embodiment of an add-on trough according to the present invention.

FIG. 9 is a top view of the trough in FIG. 8.

FIG. 12 is an end view of the trough in FIG. 8.

DETAILED DESCRIPTION

Figure 10:
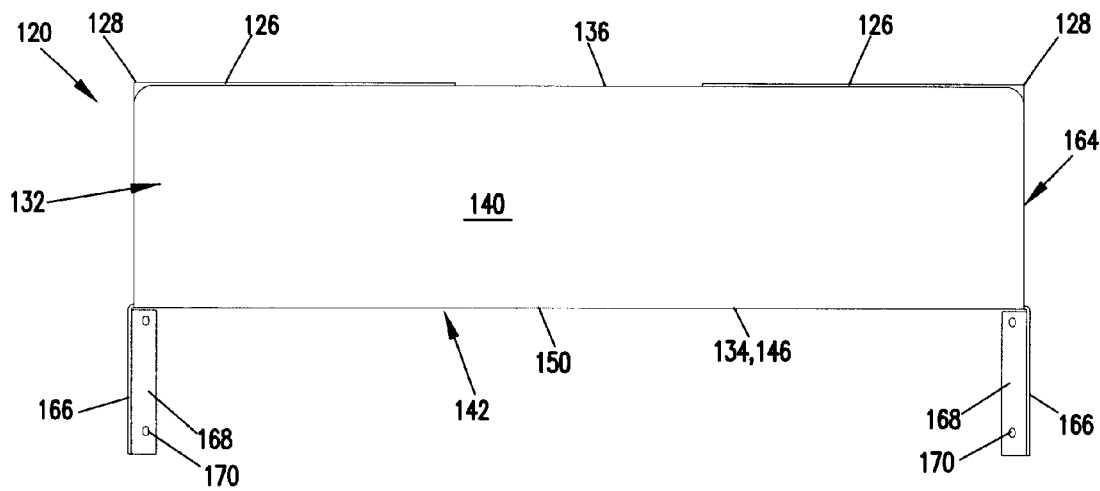
FIG. 10 is a side view of the trough in FIG. 8.
Figure 11:
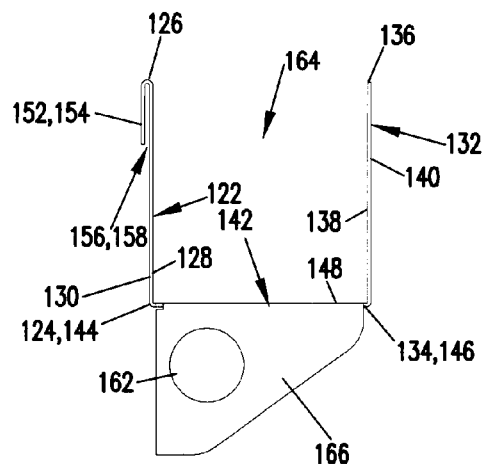
FIG. 11 is an opposite side view of the trough in FIG. 8.

Reference now will be made in detail to exemplary aspects of the present invention that are illustrated in the accompanying drawings. Wherever possible, the same reference numbers will be used throughout the drawings to refer to the same or like parts.

Referring now to FIG. 1, two telecommunications racks 10 are shown. Each rack 10 includes two vertical supports 13, a base 15 with a lower face 1, fixed upper trough 16 with a outer wall 17 with an outer edge 12 and a fixed lower trough 18 having an outer wall 19 with an outer edge 14 and a cable knockout 4 in outer wall 19. In between troughs 16 and 18 on rack 10 could be mounted a variety of telecommunications equipment, such as cross-connect modules and jacks. Representative pieces of telecommunications equipment 5 is shown in FIG. 1 in the interest of clarity, equipment 5 being mounted to supports 13 by flanges 6 and fasteners 7 inserted through holes 8 in flanges 6 and holes 9 in supports 13. Example telecommunications racks and equipments are shown in U.S. Pat. Nos. 5,220,600 and 6,102,214, the disclosures of which are incorporated by reference. It is anticipated that the present invention is adaptable to any telecommunications rack which includes one or more horizontal cable troughs.

Referring now to FIGS. 2 through 6, the details of a first add-on trough 20 in FIG. 1 are shown. An inner wall 22 has a lower edge 24, an upper edge 26, an inner side 28 and outer side 30. An outer wall 32 has a lower edge 34, an upper edge 36, an inner side 38 and an outer side 40. A bottom 42 has an inner edge 44, an outer edge 46, a upper side 48 and a lower side 50. Tabs 52 and 54 extend from upper edge 26 of inner wall 22 and are shaped to be generally parallel to outer side 30 of inner wall 22. Between tab 52 and outer side 30 of inner wall 22 is defined a slot 56. Between tab 54 and outer side 30 of inner wall 22 is defined a slot 58. Slots 56 and 58 are sized and shaped to fit over and engage outer edges 12 or 14 of fixed troughs 16 or 18 of rack 10. Bottom 42 has a shorter overall length than outer wall 32 so as to define a pair of cable exits 60 and 62 from trough 20 when trough 20 is mounted to outer edge 12 of fixed upper trough 16. Cable exits 60 and 62 allow cables lying within trough 20 to exit out of trough 20 vertically to be connected with telecommunications equipment mounted to rack 10. Inner wall 22 is shown to be same length as bottom 42. Inner wall 22 can be of greater or lesser length than bottom 42 as design or manufacturing considerations dictate. Outer wall 32 is sized to extend generally the full width of rack 10 to create a continuous outer face to the add-on trough 20 when trough 20 is mounted to fixed troughs 16 or 18.

Figure 7:
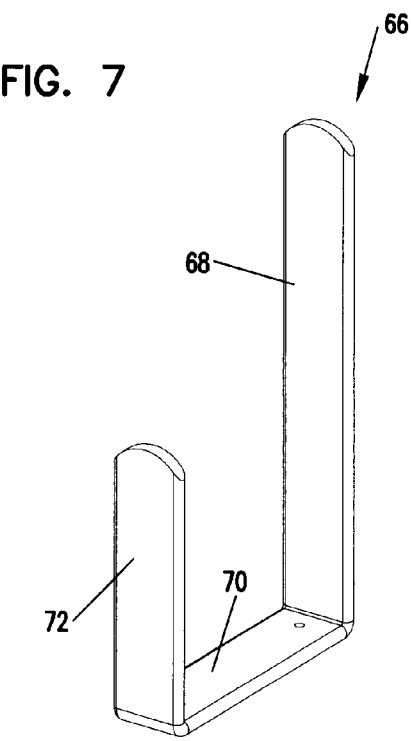
FIG. 7 is a perspective view of the reinforcing brace included in the trough in FIG. 2.

Shown mounted within a channel 64 defined by the inner sides 28 and 38 of walls 22 and 32, and by the upper side 48 of bottom 42 are a series of internal reinforcing members 66. Details of these reinforcing members 66 are shown in FIG. 7. Because of the weight of the cross-connect or jumper cables that may be laid in channel 64, reinforcing members 66 serve to provide greater rigidity and strength to trough 20 and reduce the amount of sag the weight of the cables might cause. Referring now to FIG. 7, reinforcing member is made up of three sections: outer section 68, bottom section 70 and inner section 72. As shown in the preceding FIGS., these sections are sized to fit inside of channel 64. Outer section 68 is sized to fit along and be securely fastened to inner side 38 of outer wall 32. Bottom section 70 is sized to extend across and be securely fastened to upper side 48 of bottom 42. Inner section 72 is sized to fit along and be securely fastened to inner side 28 of inner wall 22. The fastening of reinforcing member 66 to trough 20 within channel 64 can be accomplished by a variety of methods, such as welding, spot welding, gluing or riveting, so long as the inner surface of reinforcing member 66 remains predominately smooth. Sharp or tall distortions within channel 64 caused by the fastening method used are undesirable, since these distortions could interfere with cable movement within channel 64 or possibly cause damage to the cables within channel 64. The number and spacing of reinforcing members 66 required in a particular trough 20 will vary based on the nature and thickness of the material used to make trough 20 and members 66, and the number and weight of cables expected to be placed within channel 64. The four members 66 shown as part of trough 20 in FIGS. 2 through 7 are illustrative only.

Referring now to FIGS. 8 through 12, the details of a second add-on trough 120 in FIG. 1 are shown. An inner wall 122 has a lower edge 124, an upper edge 126, an inner side 128 and an outer side 130. An outer wall 132 has a lower edge 134, an upper edge 136, an inner side 138 and an outer side 140. A bottom 142 has an inner edge 144, a outer edge 146, a upper side 148 and a lower side 150. Tabs 152 and 154 extend from upper edge 126 of inner wall 122 and are shaped to be generally parallel to outer side 130 of inner wall 122. Between tab 152 and outer side 130 of inner wall 122 is defined a slot 156. Between tab 154 and outer side 130 of inner wall 122 is defined a slot 158. Slots 156 and 158 are sized and shaped to fit over and engage the outer edges 12 or 14 of fixed troughs 16 or 18 of rack 10. Extending through inner wall 122 is a cable opening 160. Cable opening 160 permits cables exiting from cable knockout 4 in outer wall 19 of lower fixed trough 18 to enter channel 164 defined by the inner sides 28 and 38 of walls 22 and 32, and by the upper side of bottom 42.

Extending below lower side 152 of bottom 142 are reinforcing legs 166. Because of the weight of the cross-connect or jumper cables that may be laid in channel 164, reinforcing legs 166 serve to provide greater rigidity and strength to trough 120 and reduce the amount of sag the weight of the cables might cause. Each reinforcing leg 166 includes a power cable opening 162 and a flange 168. Power cable opening 162 allows power cables to organized or managed as they pass across rack 10 and provide power to telecommunications equipment mounted on rack 10 but also keeps these power cables separate from the jumpers or cross-connect cables. Flanges 168 include fastener holes 170 and extend from legs 166 and provide a flat surface which rests against and is supported by lower face 11 of base 15 of rack 10. As shown, trough 122 is adapted to be mounted to the outer edge 14 of lower fixed trough 18 with flanges 162 resting against face 11. Optionally fasteners can be inserted through holes 170 into lower face 11 to secure trough 120 to fixed trough 18. Alternatively, trough 122 can be fastened more securely to rack 10 by engaging outer edge 14 with slots 156 and 158 and then inserting fasteners such as screws through flanges 168 into face 11. As a further alternative, legs 166 can be made without flanges 168.

As shown in the Figures, sides 32, 122 and 132 and bottom 142 are all approximately the same length and all extend generally the full width of rack 10.

The reinforcement design of trough 20 as shown with members 66 mounted within channel 64 is adapted for use with both upper and lower troughs, since there is not structure extending below bottom 42 which might interfere with telecommunications equipment mounted in rack 10. The reinforcement design of trough 120 with members 166 extending below bottom 142 is adapted principally for use with a lower trough, where a lower face is located beneath the fixed trough for flanges 168 to rest upon and where no telecommunications equipment will be mounted beneath the trough. In certain rack configurations, these conditions may also exist with respect to an upper trough as well, allowing trough 120 as shown to be mounted to an upper trough. Alternatively, trough 120 could be adapted by eliminating legs 166 and using the internal reinforcement design of trough 120. Then trough 120 would be suitable for use with an upper trough where vertical cable access, such as provided by openings 60 and 62, is not required.

With regard to the foregoing description, it is to be understood that changes may be made in detail, especially in matters of the construction materials employed and the shape, size and arrangement of parts without the scope of the present invention being narrowed. It is intended that the specification and depicted aspects be considered exemplary only, with the true scope and spirit of the invention being indicated by the broad meaning of the following claims.

What is claimed is as follows:

1. An add-on cable management trough for use with a trough of telecommunications rack comprising:
   a first wall having a top edge, a bottom edge, a first side, a second side and a length;
   a second wall opposing the first wall, the second wall having a top edge, a bottom edge, a first side, a second side and a length;
   a bottom having an upper side, a lower side, a first edge, a second edge and a length;
   the first edge of the bottom connecting to the bottom edge of the first wall and the second edge of the bottom connecting to the bottom edge of the second wall so that the first side of the first wall, the first side of the second wall and the upper side of the bottom define an open topped channel;

a tab attached to the top edge of the first wall with a first side and a second side;

the tab shaped so that the second side of the tab is parallel to and opposes the second side of the first wall, defining a downward facing slot between the second side of the first wall and the second side of the tab; and the slot sized and shaped to engage an edge of the trough on the telecommunications equipment rack.

2. The add-on trough of claim 1, wherein a reinforcing member, sized and shaped to fit within the open topped channel, is mounted to the first side of the first wall, the first side of the second wall and the upper side of the bottom.

3. The add-on trough of claim 2, wherein a plurality of spaced apart reinforcing members are mounted within the open topped channel to the first side of the first wall, the first side of the second wall and the upper side of the bottom.

4. The add-on trough of claim 1, wherein a plurality of tabs are attached to the top edge of the first wall, the plurality of tabs defining a plurality of slots for engaging the edge of the trough on the telecommunications equipment rack.

5. The add-on trough of claim 1, wherein a reinforcing leg extends beneath the lower side of the bottom, the reinforcing leg including a flange adapted to rest against a generally vertical portion of the rack below the trough, the flange being shaped to be coplanar to the generally vertical portion when the slot engages the edge of the trough on the telecommunications equipment rack.

6. The add-on trough of claim 5, wherein a plurality of reinforcing legs extend beneath the lower side of the bottom.

7. The add-on trough of claim 6, wherein each reinforcing leg includes a cable opening.

8. The add-on trough of claim 6, wherein a plurality of tabs are attached to the top edge of the first wall, the plurality of tabs defining a plurality of slots for engaging the edge of the trough on the telecommunications equipment rack.

9. The add-on trough of claim 6, wherein the first wall includes an opening for receiving cables from an opening in an outer wall of the trough, the opening of the first wall extending from the top edge of the first wall to the bottom edge of the first wall and defining a gap in the first wall.

10. A cable management system comprising:

a first telecommunications equipment rack having a top and a bottom and holding telecommunications equipment, a first fixed horizontal cable management trough mounted to the first rack, the first fixed horizontal cable management trough having an outer edge and an inner edge, and a first add-on cable management trough mounted to the outer edge of the first fixed horizontal cable management trough of the first rack;

wherein an outside upright surface of the first fixed horizontal cable management trough faces an inside upright surface of the first add-on cable management trough.

11. The cable management system of claim 10, wherein a second fixed horizontal cable management trough is mounted to the first rack, the second fixed horizontal cable management trough having an outer edge and an inner edge, and a second add-on cable management trough is mounted to the second fixed horizontal cable management trough, with an outside upright surface of the second fixed horizontal cable management trough facing an inside upright surface of the second add-on cable management trough.

12. The cable management system of claim 11, wherein the first fixed horizontal cable management trough is mounted adjacent to the top of the first rack and the second fixed horizontal cable management trough is mounted adjacent to the bottom of the first rack.

13. The cable management system of claim 10, farther comprising a second telecommunications equipment rack located adjacent to the first rack, the second rack having a top and a bottom and holding telecommunications equipment, a first fixed horizontal cable management trough mounted to the second rack, the first fixed horizontal cable management trough having an outer edge and an inner edge, and a first add-on cable management trough mounted to the outer edge of the first fixed horizontal cable management trough of the second rack.

14. The cable management system of claim 13, wherein a second fixed horizontal cable management trough is mounted to the first rack and a second fixed cable management trough is mounted to the second rack, each of the second fixed horizontal cable management troughs having an outer edge and an inner edge, and a second add-on cable management trough is mounted to the outer edge of each of the second fixed horizontal cable management troughs.

15. The cable management system of claim 14, wherein the first fixed horizontal cable management trough of the first rack is mounted adjacent to the top of the first rack, the first fixed horizontal cable management trough of the second rack is mounted adjacent the top of the second rack, the second fixed horizontal cable management trough of the first rack is mounted adjacent to the bottom of the first rack and the second fixed horizontal cable management trough of the second rack is mounted adjacent the bottom of the second rack.

16. The cable management system of claim 15, wherein the two first fixed horizontal cable management troughs cooperate to form a continuous upper cable channel, the two second fixed horizontal cable management troughs cooperate to form a continuous lower cable channel, the two first add-on troughs cooperate to form a continuous upper add-on cable channel and the two second add-on troughs cooperate to form a continuous lower add-on cable channel.

17. The cable management system of claim 16, wherein the continuous upper add-on channel includes a plurality of openings through a floor of the channel to permit cables to enter or exit the channel vertically.

18. The cable management system of claim 16, wherein the lower continuous add-on channel includes a plurality of openings through a wall of the channel to receive cables from openings in an adjacent wall of the lower continuous fixed channel.

19. A method for assembling a telecommunications equipment rack comprising the steps of:

providing an add-on open topped cable trough having an inside and an outside with a tab attached to an upper edge of a first wall, the tab shaped so that the tab is parallel to the first wall, defining a downward facing slot outside the trough between the first wall and the tab, the slot sized and shaped to engage an outer edge of a fixed trough on the telecommunications equipment rack;

positioning the add-on trough adjacent to the outer edge of the fixed trough of the telecommunications equipment rack; and engaging the outer edge of the fixed trough with the slot of the add-on trough.

20. A cable management system comprising:

a first telecommunications equipment rack having a top and a bottom holding telecommunications equipment;

a first fixed horizontal cable management trough mounted to the first rack, the first fixed trough having an outer edge and an inner edge, and a first add-on cable management trough mounted to the outer edge of the first fixed trough of the first rack;

a second fixed horizontal cable management trough is mounted to the first rack, the second fixed trough having an outer edge and an inner edge, and a second add-on cable management trough is mounted to the second fixed trough;

wherein an outside upright surface of the first fixed trough faces an inside upright surface of the first add-on trough, and an outside upright surface of the second fixed trough facing an inside upright surface of the second add-on trough.

21. The cable management system of claim 20, wherein the first fixed trough is mounted adjacent to the top of the first rack and the second fixed trough is mounted adjacent to the bottom of the first rack.

22. A cable management system comprising:

a first telecommunications equipment rack having a top and a bottom holding a first plurality of telecommunications equipment;

a first fixed horizontal cable management trough mounted to the first rack, the first fixed trough having an outer edge and an inner edge, and a first add-on cable management trough mounted to the outer edge of the first fixed trough of the first rack;

a second telecommunications equipment rack located adjacent to the first rack, the second rack having a top and a bottom and holding telecommunications equipment;

a first fixed horizontal cable management trough mounted to the second rack, the first fixed trough having an outer edge and an inner edge, and a first add-on cable management trough mounted to the outer edge of the first fixed trough of the second rack;

wherein an outside upright surface of the first fixed trough of the first rack faces an inside upright surface of the first add-on trough of the first rack and an outside upright surface of the first fixed trough of the second rack faces an inside upright surface of the first add-on trough of the second rack.

23. The cable management system of claim 22, wherein a second fixed horizontal cable management trough is mounted to the first rack and a second fixed cable management trough is mounted to the second rack, each of the second fixed troughs having an outer edge and an inner edge, and a second add-on cable management trough is mounted to the outer edge of each of the second fixed horizontal cable management troughs, with an upright inner surface of the second add-on trough of the first rack is facing an upright outer surface of the second fixed trough of the first rack, and an upright inner surface of the second add-on trough of the second rack is facing an upright outer surface of the second fixed trough of the second rack.

24. The cable management system of claim 23, wherein the first fixed horizontal cable management trough of the first rack is mounted adjacent to the top of the first rack, the first fixed horizontal cable management trough of the second rack is mounted adjacent the top of the second rack, the second fixed horizontal cable management trough of the first rack is mounted adjacent to the bottom of the first rack and the second fixed horizontal cable management trough of the second rack is mounted adjacent the bottom of the second rack.

25. The cable management system of claim 24, wherein the two first fixed horizontal cable management troughs cooperate to form a continuous upper cable channel, the two second fixed horizontal cable management troughs cooperate to form a continuous lower cable channel, the two first add-on troughs cooperate to form a continuous upper add-on cable channel and the two second add-on troughs cooperate to form a continuous lower add-on cable channel.

26. The cable management system of claim 25, wherein the continuous upper add-on channel includes a plurality of openings through a floor of the channel to permit cables to enter or exit the channel vertically.

27. The cable management system of claim 26, wherein the lower continuous add-on channel includes a plurality of openings through a wall of the channel to receive cables from openings in an adjacent wall of the lower continuous fixed channel.

* * * * *